United States Patent
Sweeney et al.

(10) Patent No.: US 12,104,532 B1
(45) Date of Patent: Oct. 1, 2024

(54) BYPASS DUCT HEAT EXCHANGER WITH ACCESS PANEL FOR GAS TURBINE ENGINES

(71) Applicant: Rolls-Royce North American Technologies Inc., Indianapolis, IN (US)

(72) Inventors: Patrick C. Sweeney, Indianapolis, IN (US); Douglas J. Snyder, Indianapolis, IN (US); Kerry J. Lighty, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/228,262

(22) Filed: Jul. 31, 2023

(51) Int. Cl.
*F02C 7/14* (2006.01)
*F02C 7/18* (2006.01)

(52) U.S. Cl.
CPC .................. *F02C 7/14* (2013.01); *F02C 7/18* (2013.01); *F05D 2260/213* (2013.01)

(58) Field of Classification Search
CPC ........ F02C 7/14; F02C 7/18; F05D 2260/213; F23C 6/045; F28D 2021/0026; F01D 25/14
See application file for complete search history.

(56) References Cited

U.S. PATENT DOCUMENTS

| | | |
|---|---|---|
| 8,020,298 B2 | 9/2011 | Campbell et al. |
| 8,387,362 B2 | 3/2013 | Storage et al. |
| 9,200,855 B2 | 12/2015 | Kington et al. |
| 9,243,563 B2 | 1/2016 | Lo |
| 9,267,390 B2 | 2/2016 | Lo |
| 9,587,561 B2 | 3/2017 | Snyder et al. |
| 10,450,956 B2 | 10/2019 | Schmitz |
| 10,512,193 B1 | 12/2019 | Chen et al. |
| 10,989,071 B2 | 4/2021 | Walsh et al. |
| 11,391,521 B2 | 7/2022 | Yatsuyanagi et al. |
| 2007/0295492 A1 | 12/2007 | Sharp et al. |
| 2008/0017360 A1 | 1/2008 | Campbell et al. |
| 2018/0328285 A1 * | 11/2018 | Tajiri ...................... F28F 1/325 |
| 2021/0071959 A1 * | 3/2021 | Streeter ................... B22F 5/106 |
| 2022/0260018 A1 * | 8/2022 | Sidorovich Paradiso ................... F02C 7/14 |

FOREIGN PATENT DOCUMENTS

WO   2018168698   9/2018

* cited by examiner

*Primary Examiner* — Todd E Manahan
*Assistant Examiner* — Rodolphe Andre Chabreyrie
(74) *Attorney, Agent, or Firm* — Barnes & Thornburg LLP (57) ABSTRACT

A heat exchanger assembly for a gas turbine engine includes an access panel configured to be removably coupled with an outer wall of a bypass duct arranged circumferentially around a central axis of the gas turbine engine. A heat exchanger is adapted to receive cooling fluid therein and is coupled with the access panel. A shroud extends between the access panel and the heat exchanger to collect a first portion of a flow of air through the bypass duct and direct the first portion through the heat exchanger.

20 Claims, 6 Drawing Sheets

BYPASS DUCT HEAT EXCHANGER WITH ACCESS PANEL FOR GAS TURBINE ENGINES

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat exchanger assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion reaction are exhausted out of the turbine and may provide thrust in some applications.

Gas turbine engines for aircraft typically include a fan and a bypass duct. The fan is driven by the turbine and pushes air through the bypass duct to create thrust for the aircraft. The bypass duct may include components configured to transfer heat between cooling fluids and the air flowing through the bypass duct. It is desirable to improve the efficiency, manufacturability, and access to such components.

SUMMARY

The present disclosure may comprise one or more of the following features and combinations thereof.

In a first aspect of the disclosed embodiments, a gas turbine engine includes a bypass duct arranged circumferentially around a central axis of the gas turbine engine and configured to direct a flow of air through the bypass duct. The bypass duct includes an outer wall defining an outer boundary of a flow path of the flow of air and an inner wall defining an inner boundary of the flow path of the flow of air. The outer wall is formed to define an access opening adapted to allow access into the bypass duct from radially outside of the outer wall. A heat exchanger assembly is removably coupled with the outer wall and configured to transfer heat from a cooling fluid to the flow of air passing through the bypass duct, the heat exchanger assembly. The heat exchanger assembly includes an access panel removably coupled with the outer wall to cover the access opening. A heat exchanger is adapted to receive the cooling fluid therein and is coupled with the access panel for movement with the access panel in response to the access panel being uncoupled from the outer wall. A shroud extends between the access panel and the heat exchanger and is configured to collect a first portion of the flow of air and direct the first portion through the heat exchanger and allow a second portion of the air to flow around the shroud without passing through the heat exchanger.

In some embodiments of the first aspect, the heat exchanger may extend from a first axial end of the access panel radially inward to a second axial end of the access panel that is opposite the first axial end of the access panel. The heat exchanger may include an inlet conduit that extends radially through an axial aft end of the access panel. An outlet conduit may extend radially through the axial aft end of the access panel. A flow passage may be fluidly connected with the inlet conduit and the outlet conduit. The flow passage may be configured to direct the cooling fluid from the inlet conduit axially forward, turn, and conduct the cooling fluid axially aft and to the outlet conduit. The shroud may include a first side wall coupled with a first circumferential end of the heat exchanger and a second side wall spaced apart circumferentially away from the first side wall and coupled with a second circumferential end of the heat exchanger. The first side wall and the second side wall may cooperate to define an inlet of the shroud at an axially forward end of the heat exchanger assembly.

Optionally, in the first aspect, the heat exchanger may extend from an axial forward and first circumferential location of the access panel, axially aft and circumferentially away, to an axial aft and second circumferential location. The shroud may include a first side wall coupled with a radial inner end of the heat exchanger and a second side wall coupled with the first side wall and extending radially outward away from the first side wall toward the access panel to define an inlet of the shroud at an axially forward end of the heat exchanger assembly. The heat exchanger may include an inlet conduit that extends radially through the access panel. An outlet conduit may extend radially through the access panel. A flow passage may be fluidly connected with the inlet conduit and the outlet conduit.

It may be desired, in the first aspect, that the heat exchanger and the shroud are at least partially located outside a footprint of the access panel when the heat exchanger assembly is viewed radially outward looking radially inward. The heat exchanger and the shroud may be supported entirely by the access panel.

In a second aspect of the disclosed embodiments, a heat exchanger assembly for a gas turbine engine includes an access panel configured to be removably coupled with an outer wall of a bypass duct arranged circumferentially around a central axis of the gas turbine engine. The access panel is configured to cover an access opening adapted to allow access into the bypass duct through the outer wall. A heat exchanger is adapted to receive cooling fluid therein and is coupled with the access panel. A shroud extends between the access panel and the heat exchanger. The shroud is configured to collect a first portion of a flow of air through the bypass duct and direct the first portion through the heat exchanger to transfer heat from the cooling fluid to the first portion. The shroud is further configured to allow a second portion of the flow of air to flow around circumferential ends of the shroud without passing through the heat exchanger.

In some embodiments of the second aspect, the heat exchanger may extend radially inward from the access panel. The shroud may include a first side wall and a second side wall circumferentially spaced apart from the first side wall to define an inlet of the shroud at an axially forward end of the heat exchanger assembly. The heat exchanger may include an inlet conduit that extends through an end of the access panel. An outlet conduit may extend through the end of the access panel. A flow passage may be fluidly connected with the inlet conduit and the outlet conduit to direct the cooling fluid from the inlet conduit to the outlet conduit.

Optionally, in the second aspect, the heat exchanger may extend axially from a first location of the access panel to a second location of the access panel. The shroud may include a first side wall and a second side wall coupled with the first side wall and extending from the first side wall toward the access panel to define an inlet of the shroud at an axially forward end of the heat exchanger assembly. The heat exchanger may include an inlet conduit extending through the access panel. An outlet conduit may extend through the access panel and spaced axially from the inlet conduit. A flow passage may be fluidly connected with the inlet conduit and the outlet conduit to direct the cooling fluid from the inlet conduit axially to the outlet conduit.

It may be desired, in the second aspect, that the heat exchanger and the shroud are at least partially located outside a footprint of the access panel when the heat exchanger assembly is viewed radially outward looking radially inward. The heat exchanger and the shroud may be supported entirely by the access panel.

In a third aspect of the disclosed embodiments, a method of transferring heat from a cooling fluid to a flow of air passing through a bypass duct a gas turbine engine includes removably coupling a heat exchanger assembly to an outer wall of the bypass duct. The method also includes removably coupling an access panel of the heat exchanger assembly with the outer wall to cover an access opening adapted to allow access into the bypass duct through the outer wall. The method also includes moving the heat exchanger with the access panel in response to the access panel being uncoupled from the outer wall.

In some embodiments the method may include supporting the heat exchanger entirely by the access panel.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
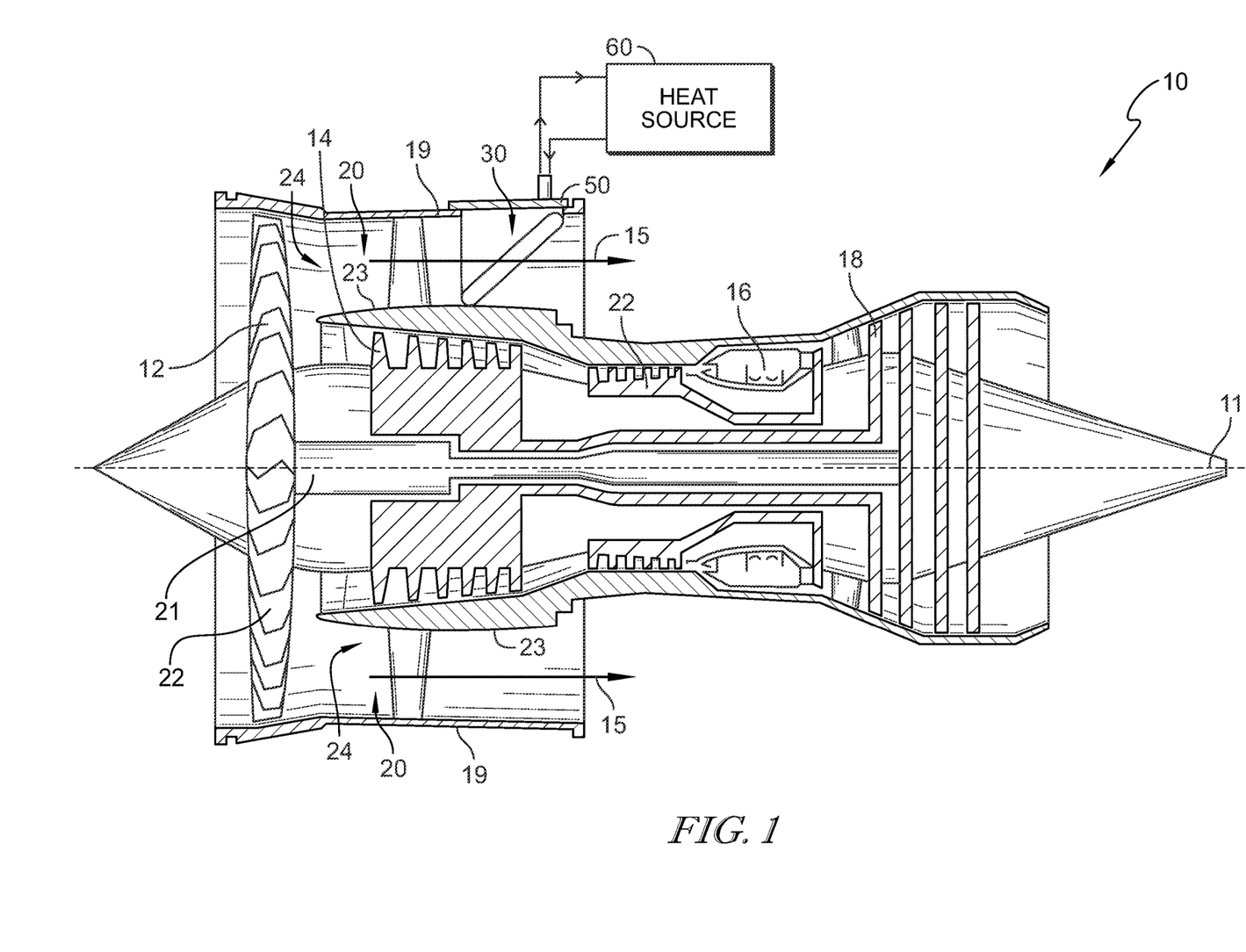
FIG. 1 is a cutaway view of a gas turbine engine that includes a fan, a heat exchanger assembly located in a bypass duct, a compressor, a combustor downstream of the compressor, and a turbine downstream of the combustor, wherein the bypass duct of the gas turbine engine includes an outer wall and an inner wall that define a radially outer and inner boundary of a flow path for a flow of air through the bypass duct, and the heat exchanger assembly is arranged in the bypass duct and includes a shroud that directs the flow of air through the heat exchanger assembly and a heat exchanger coupled to the shroud.

Referring to FIG. 1, an illustrative aerospace gas turbine engine 10 includes a fan assembly 12, a compressor 14, a combustor 16 located downstream of the compressor 14, and a turbine 18 located downstream of the combustor 16. The fan assembly 12 is driven by the turbine 18 and provides thrust for propelling the gas turbine engine 10 by forcing bypass air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 includes a fan 21 having a plurality of fan blades 22 that extend radially outward relative to the central axis 11. The plurality of fan blades 22 rotate about the central axis 11 to force the bypass air 15 through a flow path 24 such that the bypass air 15 is directed through the bypass duct 20 to provide thrust to propel the gas turbine engine 10.

The bypass duct 20 is arranged circumferentially around the central axis 11 and is configured to direct the bypass air 15 through the bypass duct 20. The bypass duct 20 includes an outer wall 19 and an inner wall 23. The outer wall 19 defines a radially outer boundary of the flow path 24 of the bypass duct 20. The inner wall 23 defines a radially inner boundary of the flow path 24 of the bypass duct 20. The outer wall 19 is generally annular and extends around the central axis 11. In some embodiments, the outer wall 19 is segmented, partially segmented, or formed as a single annular ring that extends entirely circumferentially around the central axis 11. The outer wall 19 is formed to define an access opening 30 adapted to allow access into the bypass duct 20 from radially outside of the outer wall 19.

In the illustrative embodiment, the gas turbine engine 10 further includes a heat exchanger assembly 50 located in the bypass duct 20. The bypass air 15 flowing through the flow path 24 passes through the heat exchanger assembly 50, and the heat exchanger assembly 50 transfers heat from a cooling fluid passing from a heat source 60 through the heat exchanger assembly 50 to the bypass air 15. In some embodiments, the cooling fluid from the heat source 60 is a gas or liquid, such as a refrigerant, water, air, etc. The heat source 60 may be electronics, the compressor, the turbine, fuel, oil, etc.

Figure 2:
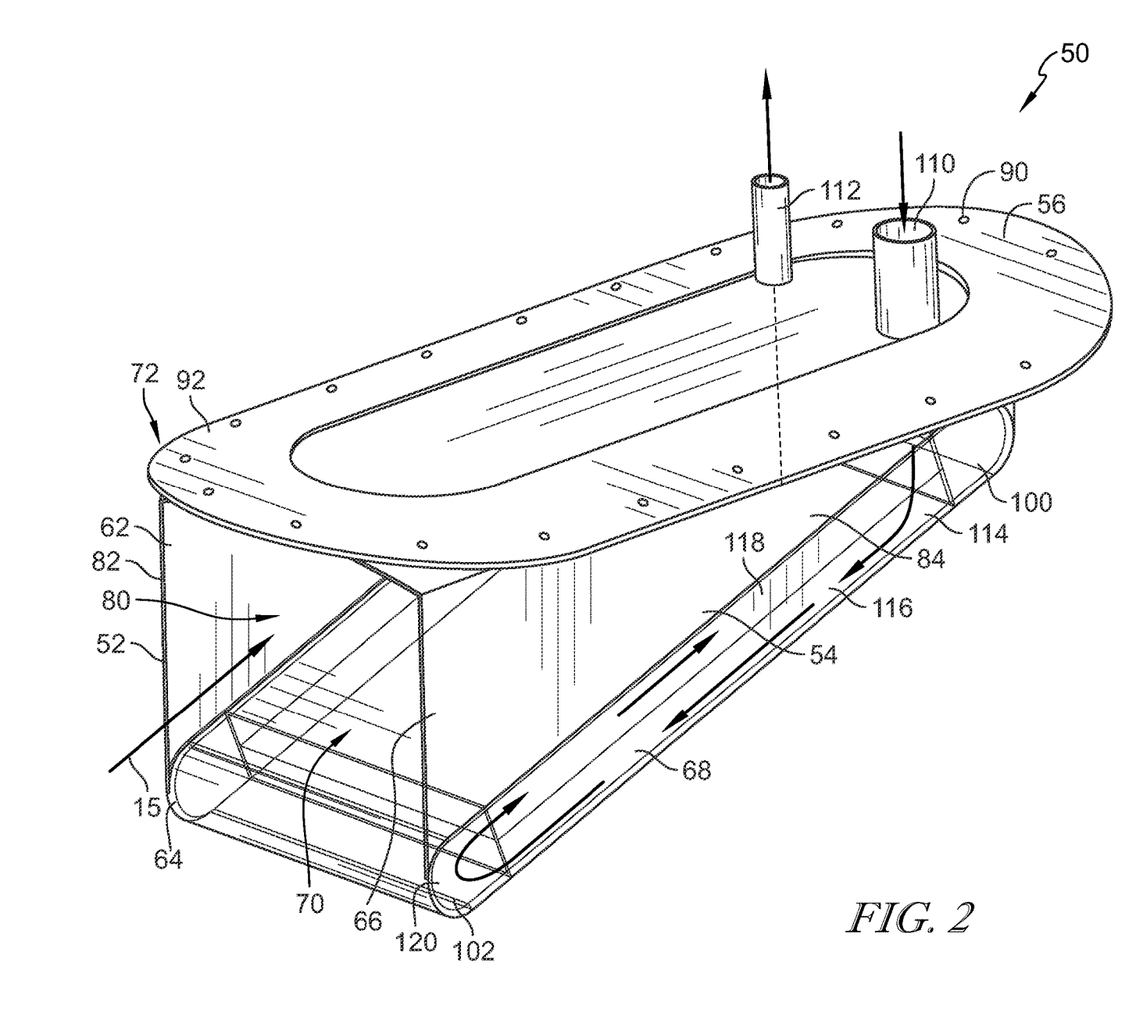
FIG. 2 is a perspective view of an embodiment of a heat exchanger assembly of FIG. 1 showing the heat exchanger assembly includes an access panel, a heat exchanger extending from the access panel, and a shroud configured to direct a flow of air through the heat exchanger, wherein the heat exchanger includes an inlet conduit, an outlet conduit, and a flow passage that is fluidly connected with the inlet conduit and the outlet conduit, and wherein the flow passage is configured to direct cooling fluid from the inlet conduit axially forward, turn, and conduct the cooling fluid axially aft and to the outlet conduit.

Referring to FIG. 2, the heat exchanger assembly 50 includes a shroud 52, a heat exchanger 54, and an access panel 56. The shroud 52 is configured to direct the bypass air 15 through the heat exchanger assembly 50. The shroud 52 includes a first side wall 62 coupled with a first circumferential end 64 of the heat exchanger 54 to define a first circumferential end 82 of the shroud 52. A second side wall 66 is spaced apart circumferentially away from the first side wall 62. The second side wall 66 is coupled with a second circumferential end 68 of the heat exchanger 54 to define a second circumferential end 84 of the shroud 52. The first side wall 62 and the second side wall 66 cooperate to define a cavity 80 in the shroud 52. The cavity 80 includes an inlet 70. The inlet 70 is positioned at an axially forward end 72 of the heat exchanger assembly 50 so that the cavity 80 extends axially aft from the inlet 70. The shroud 52 extends between the access panel 56 and the heat exchanger 54 to collect a first portion of the bypass air 15 at the inlet 70 and direct the first portion of the bypass air 15 through the heat exchanger 54. That is, the first portion of the bypass air 15 passes through the inlet 70 and into the cavity 80. The first portion of the bypass air 15 exits the cavity 80 by passing through the heat exchanger 54. The shroud 52 allows a second portion of the bypass air 15 to flow around the circumferential ends 82 and 84 of the shroud 52 without passing through the heat exchanger 54.

The heat exchanger 54 is positioned downstream of the shroud 52 and is configured to receive the cooling fluid from the heat source 60 to transfer heat from the cooling fluid passing through the heat exchanger 54 to the bypass air 15. In some embodiments, the heat exchanger 54 includes a radiator having a plurality of tubes and/or fins that pass the cooling fluid from the heat source 60. The bypass air 15 is configured to flow over and through the plurality of tubes and/or fins. In other embodiments, the heat exchanger 54 includes any design for exposing the bypass air 15 to the cooling fluid.

The heat exchanger 54 extends from an aft end 90 of the access panel 56 radially inward away from the access panel 56. The heat exchanger 54 also extends axially forward toward a forward end 92 of the access panel 56. At the aft end 90 of the access panel 56, an aft end 100 of the heat exchanger 54 is positioned adjacent the access panel 56. At the forward end 90 of the access panel 56, a forward end 102 of the heat exchanger 54 is spaced apart from the access panel 56.

The heat exchanger 54 includes an inlet conduit 110 that extends radially through the axial aft end 90 of the access panel 56. An outlet conduit 112 extends radially through the axial aft end 90 of the access panel 56. A flow passage 114 is fluidly connected with the inlet conduit 110 and the outlet conduit 112. The flow passage 114 includes a forward flowing passage 116 configured to direct the cooling fluid from the inlet conduit 110 at the aft end 100 of the heat exchanger 54 axially forward toward the forward end 102 of the heat exchanger 54. An aft flowing passage 118 conducts the cooling fluid axially aft from the forward end 102 of the heat exchanger 54 to the outlet conduit 112 at the aft end 100 of the heat exchanger 54. A turn 120 at the forward end of the heat exchanger 54 connects the forward flowing passage 116 and the aft flowing passage 118 so that the cooling fluid flows from the forward flowing passage 116 to the aft flowing passage 118. In one embodiment, the forward flowing passage 116 is positioned radially inward of the aft flowing passage 118. In one embodiment, the forward flowing passage 116 is positioned radially outward of the aft flowing passage 118.

Figure 3:
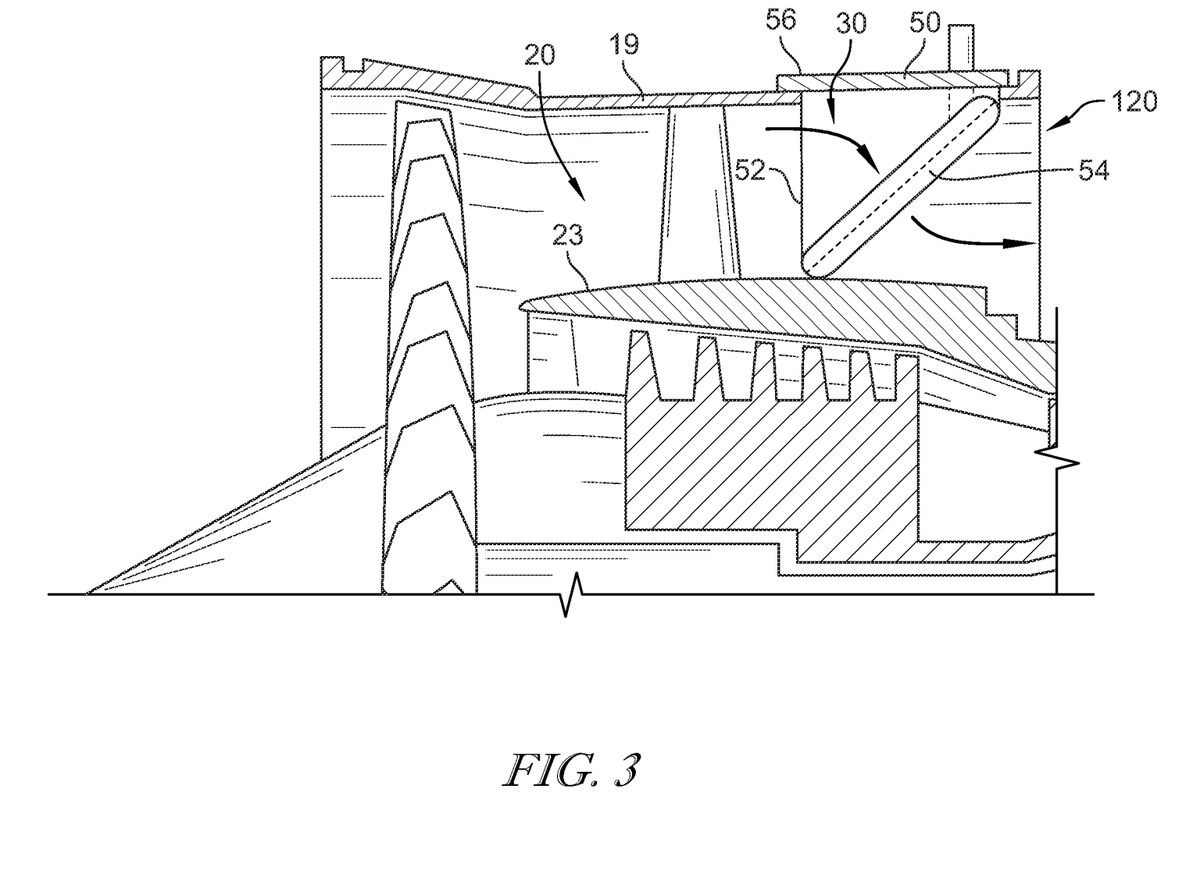
FIG. 3 is a cutaway view of the heat exchanger assembly shown in FIG. 2 positioned in the bypass duct shown in FIG. 1 and extending radially inward from an access opening of the bypass duct.

Referring now to FIG. 3, the heat exchanger assembly 50 is removably coupled with the outer wall 19 of the bypass duct 20. The access panel 56 is removably coupled with the outer wall 19 to cover the access opening 30. In the illustrative embodiment, the heat exchanger 54 and the shroud 52 are supported entirely by the access panel 56. The heat exchanger 54 is coupled with the access panel 56 for movement with the access panel 56 in response to the access panel 56 being uncoupled from the outer wall 19. The shroud 52 is also coupled with the access panel 56 for movement with the access panel 56 in response to the access panel 56 being uncoupled from the outer wall 19. As such, the entire heat exchanger assembly 50 is able to be installed and removed from the bypass duct 20 to allow for installation, repairs, replacement parts, access into the bypass duct 20, etc. Typically the access panels 56 are located for removal-replacement while the engine 10 is installed on-wing. As such, the heat exchanger assemblies 50 are line-replaceable.

The heat exchanger assembly 50, is positioned in the bypass duct 20 so that the heat exchanger 54 extends radially inward away from the outer wall 19 toward the inner wall 23. In some embodiments, the heat exchanger 54 extends entirely from the outer wall 19 to the inner wall 23. In some embodiments, the heat exchanger 54 extends partially from the outer wall 19 toward the inner wall 23. The heat exchanger 54 also extends axially forward from an aft end 120 of the bypass duct 20. The heat exchanger assembly 50 extends partially circumferentially around the central axis 11 in the bypass duct 20. In some embodiments, more than one heat exchanger assembly 50 is circumferentially positioned in the bypass duct 20.

In some embodiments, the heat exchanger 54 and the shroud 52 extend partially outside of a footprint of the access panel 56 when the heat exchanger assembly 50 is viewed radially outward looking radially inward. For example, the heat exchanger 54 and shroud 52 may extend axially forward beyond a forward end of the access panel 56. Even still, the heat exchanger 54 and the shroud 52 are sized to be installed and removed from the bypass duct 20 without interference, for example, by angling and/or rotating the assembly 50 during installation and removal.

In some embodiments, the heat exchanger 54 and the shroud 52 are entirely located within a footprint of the access panel 56 when the heat exchanger assembly 50 is viewed radially outward looking radially inward. It will be appreciated that, in some embodiments, the heat exchanger 54 and the shroud 52 are located within less than the footprint of the access panel 56 when the heat exchanger assembly 50 is viewed radially outward looking radially inward. The heat exchanger 54 and the shroud 52 are also entirely located within a footprint of the access opening 30 when the heat exchanger assembly 50 is viewed radially outward looking radially inward to enable the heat exchanger assembly 50 to be inserted and removed through the access opening 30. It will be appreciated that, in some embodiments, the heat exchanger 54 and the shroud 52 are located within less than the footprint of the access opening 30 when the heat exchanger assembly 50 is viewed radially outward looking radially inward.

Figure 3A:
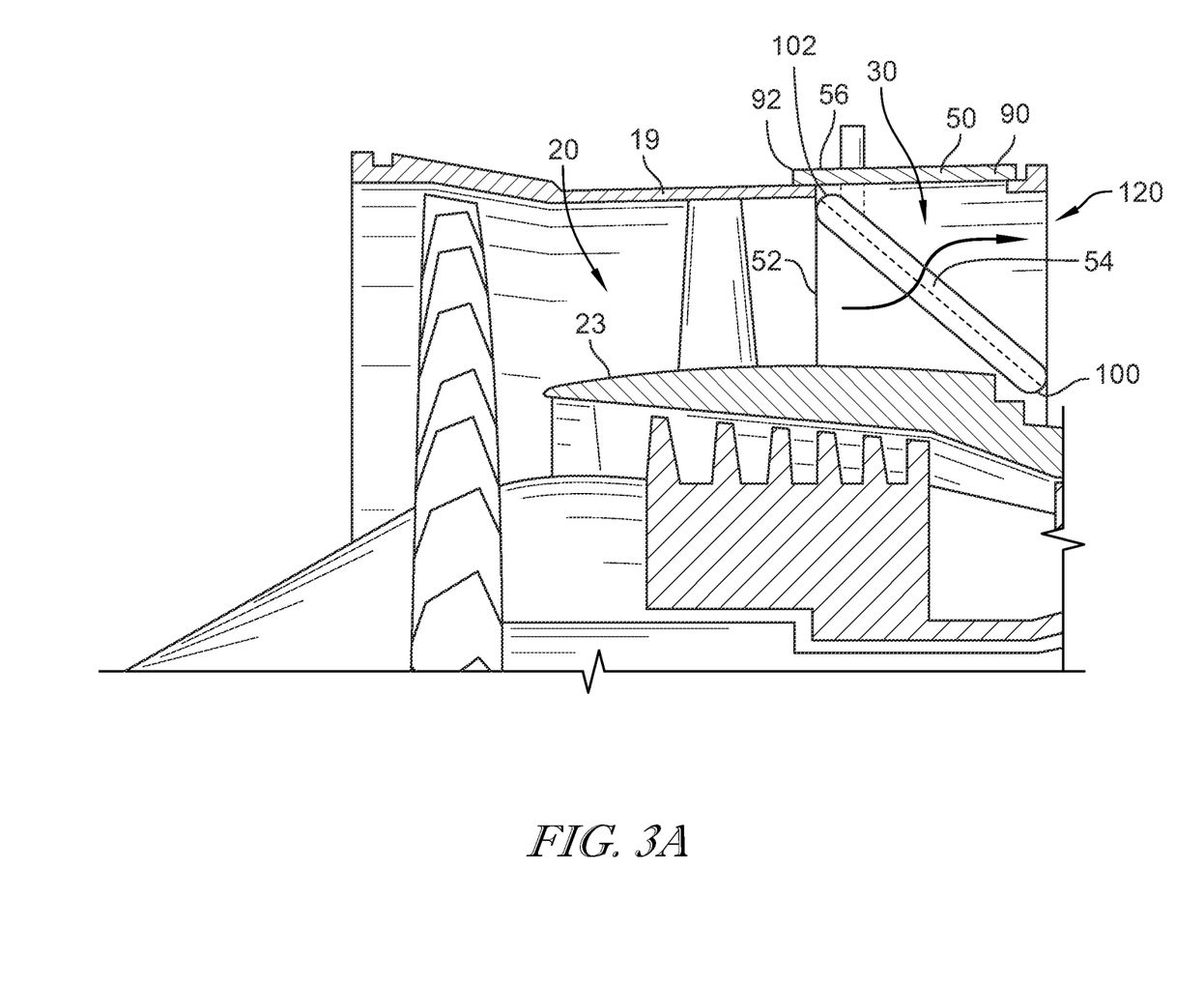
FIG. 3A is a cutaway view of a gas turbine engine having another embodiment of a heat exchanger assembly positioned in the bypass duct showing the heat exchanger extends radially inward and axially aft and is partially located outside of a footprint of the access panel.

In the embodiment shown in FIG. 3A, the heat exchanger 54 extends from the forward end 92 of the access panel 56 radially inward away from the access panel 56. The heat exchanger 54 also extends axially aft toward the aft end 90 of the access panel 56. At the forward end 92 of the access panel 56, the forward end 102 of the heat exchanger 54 is positioned radially adjacent the access panel 56. At the aft end 92 of the access panel 56, an aft end 100 of the heat exchanger 54 is spaced apart radially from the access panel 56. In this embodiment, the heat exchanger 54 and the shroud 52 are at least partially located outside a footprint of the access panel 56 when the heat exchanger assembly 50 is viewed radially outward looking radially inward.

The engine access panel-mounted heat exchanger assembly 50, shown in FIGS. 2-3A, satisfies a line replaceable unit desired for a low, medium, or high-bypass ratio turbofan engine with access panels in the outer bypass duct 20. It further satisfies a desire for maximizing heat rejection to the bypass duct air flow while minimizing duct pressure drop by minimizing the projected frontal area of the heat exchanger assembly air inlet 70. The angled orientation of the heat exchanger 54 may allow the heat exchanger 54 to be longer than the length of the access opening 30 to maximize heat rejection capacity. The length may be limited by the annular height of the bypass duct 20 and the ability to mechanically support the cantilevered structure from the access panel 56. The mount system allows for thermal growth and part tolerance variations.

Furthermore, the heat exchanger assembly 50 lends itself well to two tube-side passes to allow hot fluid flows through half the tubes of the heat exchanger 54 in one direction and hot fluid flows in the opposite direction through the other half of the tubes of the heat exchanger 54, which consolidates the hot side fluid port to one end of the heat exchanger. The hot side fluid port interface offers a convenient place for a sealing and break-in point for maintenance activities. The coolant connection ports are integrated with the heat exchanger 54 and feed through the access panel 56 to eliminate the need to have a hot side fluid connection within the fan stream flow path.

Figure 4:
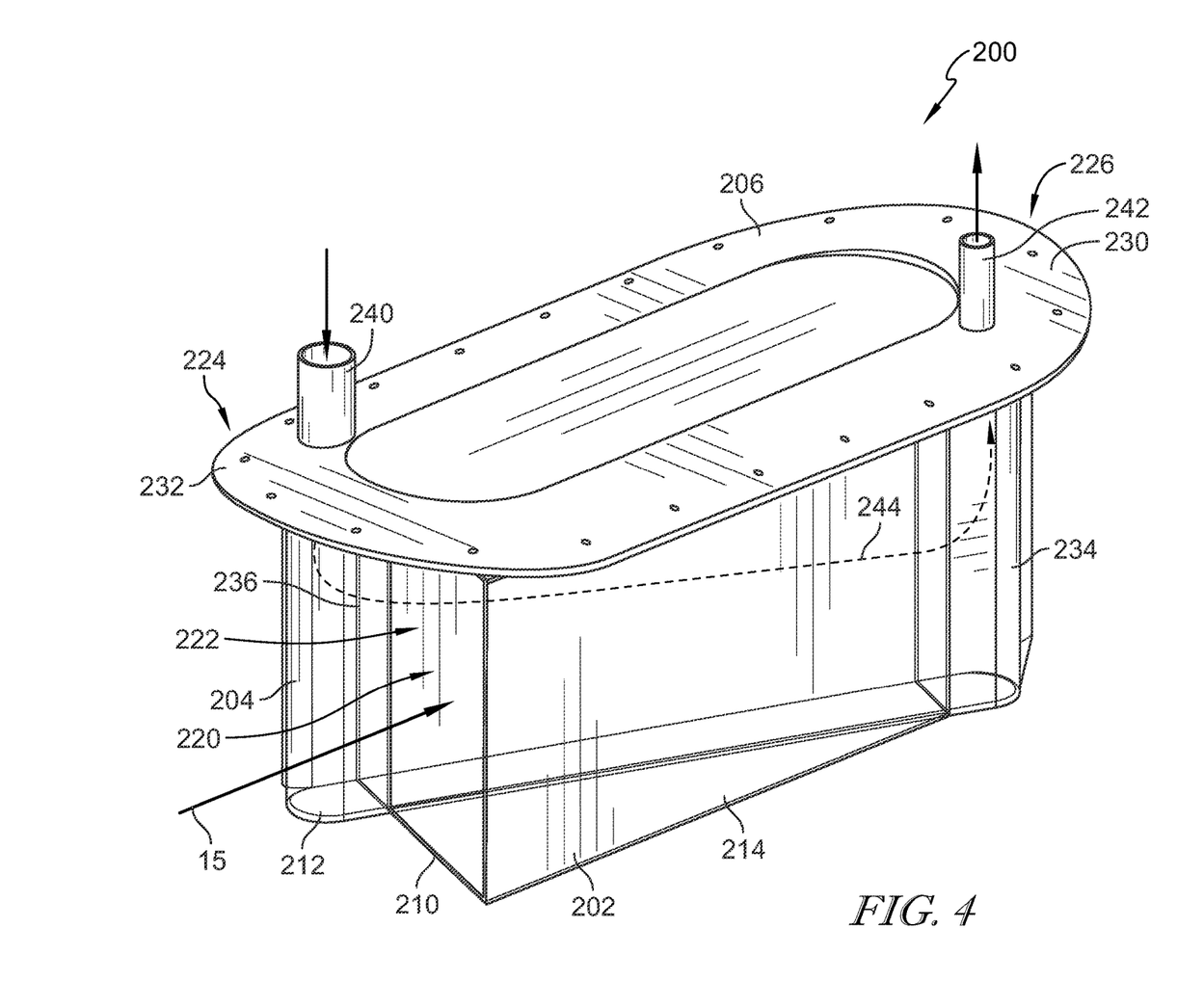
FIG. 4 is a perspective view of an embodiment of a heat exchanger assembly including an access panel, a heat exchanger extending from the access panel, and a shroud configured to direct a flow of air through the heat exchanger, wherein the heat exchanger includes an inlet conduit, an outlet conduit, and a flow passage that is fluidly connected with the inlet conduit and the outlet conduit, and wherein the flow passage is configured to direct cooling fluid from the inlet conduit axially aft to the outlet conduit.

Referring to FIG. 4, another embodiment of a heat exchanger assembly 200 includes a shroud 202, a heat exchanger 204, and an access panel 206. The shroud 202 is configured to direct the bypass air 15 through the heat exchanger assembly 200. The shroud 202 includes a first side wall 210 coupled with a radial inner end 212 of the heat exchanger 204. A second side wall 214 is coupled with the first side wall 210 and extends radially outward away from the first side wall 210 toward the access panel 206 to define a cavity 220 in the shroud 202. The cavity 220 includes an inlet 222. The inlet 222 of the shroud 202 is positioned at an axially forward end 224 of the heat exchanger assembly 200 so that the cavity 220 extends axially aft from the inlet 222 toward an axially aft end 226 of the heat exchanger assembly 200. The shroud 202 extends from the access panel 206 adjacent to the heat exchanger 204 to collect a first portion of the bypass air 15 at the inlet 222 and direct the first portion of the bypass air 15 through the heat exchanger 204. That is, the first portion of the bypass air 15 passes through the inlet 222 and into the cavity 220. The first portion of the bypass air 15 exits the cavity 220 by passing through the heat exchanger 204. The shroud 202 allows a second portion of the bypass air 15 to flow around the shroud 202 without passing into the cavity 220 and through the heat exchanger 204.

The heat exchanger 204 is positioned downstream of the shroud 202 and is configured to receive the cooling fluid from the heat source 60 to transfer heat from the cooling fluid passing through the heat exchanger 204 to the bypass air 15. In some embodiments, the heat exchanger 204 includes a radiator having a plurality of tubes and/or fins that pass the cooling fluid from the heat source 60. The bypass air 15 is configured to flow over and through the plurality of tubes and/or fins. In other embodiments, the heat exchanger 204 includes any design for exposing the bypass air 15 to the cooling fluid. The heat exchanger 204 extends radially inward from the access panel 206 to first side wall 210 of the shroud 202.

The heat exchanger 204 extends axially forward from an axially aft end 230 of the access panel 206 to an axially forward end 232 of the access panel 206. The heat exchanger 204 also extends from a first circumferential position 234 at the aft end of the access panel 206 to a second circumferential position 236 at the forward end 232 of the access panel 206. The first circumferential position 234 and the second circumferential position 236 are circumferentially offset. In some embodiments, the heat exchanger 204 extends in any circumferential direction moving from the aft end 230 of the access panel 206 to the forward end 232 of the access panel 206. In some embodiments, the first circumferential position 234 and the second circumferential position 236 are circumferentially aligned.

The heat exchanger 204 includes an inlet conduit 240 that extends radially through the axial forward end 232 of the access panel 206. An outlet conduit 242 extends radially through the axial aft end 230 of the access panel 206. The inlet conduit 240 and the outlet conduit 242 are circumferentially offset. In some embodiments, the inlet conduit 240 and the outlet conduit 242 are circumferentially aligned. A flow passage 244 is fluidly connected with the inlet conduit 240 and the outlet conduit 242. The flow passage 244 is configured to direct the cooling fluid from the inlet conduit 240 axially aft to the outlet conduit 242. It will be appreciated that, in some embodiments, the inlet conduit 240 extends radially through the axial aft end 230 of the access panel 206, and the outlet conduit 242 extends radially through the axially forward end 232 of the access panel 206. In such an embodiment, the flow passage 244 is configured to direct the cooling fluid from the inlet conduit 240 axially forward to the outlet conduit 242.

The inlet conduit 240 and the outlet conduit 242 are spaced any axial distance along the access panel 206, in some embodiments. Accordingly, in some embodiments, the heat exchanger 204 and the flow passage 244 extend any axial distance along the access panel 206, as defined by a position of the inlet conduit 240 and the outlet conduit 242.

Figure 5:
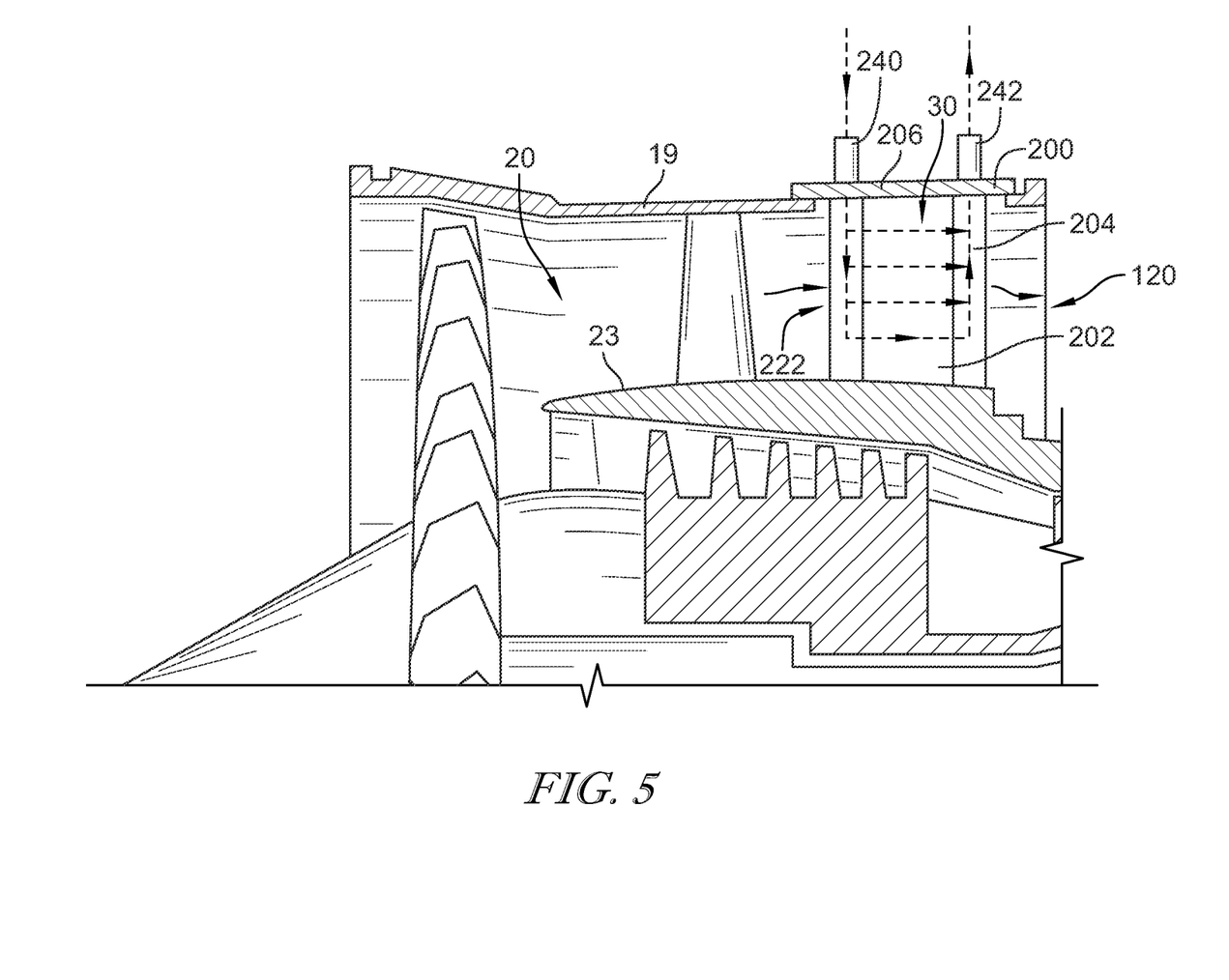
FIG. 5 is a cutaway view of the heat exchanger assembly shown in FIG. 4 positioned in the bypass duct shown in FIG. 1 and extending radially inward from an access opening of the bypass duct.

Referring now to FIG. 5, the heat exchanger assembly 200 is removably coupled with the outer wall 19 of the bypass duct 20. The access panel 206 is removably coupled with the outer wall 19 to cover the access opening 30. In some embodiments, the heat exchanger 204 and the shroud 202 are supported entirely by the access panel 206. The heat exchanger 204 is coupled with the access panel 206 for movement with the access panel 206 in response to the access panel 206 being uncoupled from the outer wall 19. The shroud 202 is also coupled with the access panel 206 for movement with the access panel 206 in response to the access panel 206 being uncoupled from the outer wall 19.

The heat exchanger assembly 200, is positioned in the bypass duct 20 so that the heat exchanger 204 extends radially inward away from the outer wall 19 toward the inner wall 23. In some embodiments, the heat exchanger 204 extends entirely from the outer wall 19 to the inner wall 23. In some embodiments, the heat exchanger 204 extends partially from the outer wall 19 toward the inner wall 23. The heat exchanger 204 also extends axially forward from the aft end 120 of the bypass duct 20. The heat exchanger assembly 200 extends partially circumferentially around the central axis 11 in the bypass duct 20. In some embodiments, more than one heat exchanger assembly 200 is circumferentially spaced in the bypass duct 20.

The heat exchanger 204 and the shroud 202 are entirely located within a footprint of the access panel 206 when the heat exchanger assembly 200 is viewed radially outward looking radially inward. It will be appreciated that, the heat exchanger 204 and the shroud 202 are located within less than the footprint of the access panel 206 when the heat exchanger assembly 200 is viewed radially outward looking radially inward. The heat exchanger 204 and the shroud 202 may be entirely located within a footprint of the access opening 30 when the heat exchanger assembly 200 is viewed radially outward looking radially inward to enable the heat exchanger assembly 200 to be inserted and removed through the access opening 30. It will be appreciated that, the heat exchanger 204 and the shroud 202 are located within less than the footprint of the access opening 30 when the heat exchanger assembly 200 is viewed radially outward looking radially inward.

The engine access panel-mounted heat exchanger assembly 200, shown in FIGS. 4-5, may simplify the structural support of the heat exchanger 204. Angled presentation of the air inlet 222 projected area is maintained. For this embodiment, the heat exchanger no-flow direction is limited by the annular height of the bypass duct 20. Additional heat rejection capacity can be achieved by increasing thickness in the air flow direction. A single tube-side pass where hot fluid flows through all the tubes of the heat exchanger 204 in one direction may be used in this embodiment or the two pass direction of flow of FIGS. 2-3A.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
   a bypass duct arranged circumferentially around a central axis of the gas turbine engine and configured to direct a flow of air through the bypass duct, the bypass duct including an outer wall defining an outer boundary of a flow path of the flow of air and an inner wall defining an inner boundary of the flow path of the flow of air, the outer wall formed to define an access opening adapted to allow access into the bypass duct from radially outside of the outer wall, and
   a heat exchanger assembly removably coupled with the outer wall and configured to transfer heat from a cooling fluid to the flow of air passing through the bypass duct, the heat exchanger assembly including an access panel removably coupled with the outer wall to cover the access opening, a heat exchanger adapted to receive the cooling fluid therein and coupled with the access panel for movement with the access panel in response to the access panel being uncoupled from the outer wall, and a shroud extending between the access panel and the heat exchanger and configured to collect a first portion of the flow of air and direct the first portion through the heat exchanger and allow a second portion of the flow of air to flow around the shroud without passing through the heat exchanger,
   wherein the heat exchanger assembly extends entirely from the outer wall of the bypass duct to the inner wall of the bypass duct.

2. The gas turbine engine of claim 1, wherein the heat exchanger extends from a first axial end of the access panel radially inward to a second axial end of the access panel that is opposite the first axial end of the access panel.

3. The gas turbine engine of claim 2, wherein the heat exchanger includes an inlet conduit that extends radially through an axial aft end of the access panel, an outlet conduit that extends radially through the axial aft end of the access panel, and a flow passage that is fluidly connected with the inlet conduit and the outlet conduit, and wherein the flow passage is configured to direct the cooling fluid from the inlet conduit axially forward, turn, and conduct the cooling fluid axially aft and to the outlet conduit.

4. The gas turbine engine of claim 1, wherein the shroud includes a first side wall coupled with a first circumferential end of the heat exchanger and a second side wall spaced apart circumferentially away from the first side wall and coupled with a second circumferential end of the heat exchanger and wherein the first side wall and the second side wall cooperate to define an inlet of the shroud at an axially forward end of the heat exchanger assembly, and wherein the first side wall of the shroud terminates at a first radially innermost edge of the first circumferential end of the heat exchanger and the second side wall of the shroud terminates at a second radially innermost edge of the second circumferential end of the heat exchanger.

5. The gas turbine engine of claim 1, wherein the heat exchanger extends from an axial forward and first circumferential location of the access panel, axially aft and circumferentially away, to an axial aft and second circumferential location.

6. The gas turbine engine of claim 5, wherein the shroud includes a first side wall coupled with a radial inner end of the heat exchanger and a second side wall coupled with the first side wall and extending radially outward away from the first side wall toward the access panel to define an inlet of the shroud at an axially forward end of the heat exchanger assembly.

7. The gas turbine engine of claim 5, wherein the heat exchanger includes an inlet conduit that extends radially through the access panel, an outlet conduit that extends radially through the access panel, and a flow passage that is fluidly connected with the inlet conduit and the outlet conduit.

8. The gas turbine engine of claim 1, wherein the heat exchanger and the shroud are at least partially located outside a footprint of the access panel when the heat exchanger assembly is viewed radially outward looking radially inward.

9. The gas turbine engine of claim 1, wherein the heat exchanger and the shroud are supported entirely by the access panel.

10. A heat exchanger assembly of a gas turbine engine comprising:
    an access panel configured to be removably coupled with an outer wall of a bypass duct arranged circumferentially around a central axis of the gas turbine engine, the outer wall defining an outer boundary of a flow path of a flow of air, the access panel configured to cover an access opening adapted to allow access into the bypass duct through the outer wall, the access opening being radially spaced apart from an inner wall of the bypass duct arranged circumferentially around the central axis and defining an inner boundary of the flow path of the flow of air,
    a heat exchanger adapted to receive cooling fluid therein and coupled with the access panel, the heat exchanger extending from the outer wall of the bypass duct to the inner wall of the bypass duct, and a shroud extending between the access panel and the heat exchanger, the shroud configured to collect a first portion of the flow of air flowing through the bypass duct and direct the first portion through the heat exchanger to transfer heat from the cooling fluid to the first portion, the shroud further configured to allow a second portion of the flow of air to flow around circumferential ends of the shroud without passing through the heat exchanger.

11. The heat exchanger assembly of claim 10, wherein the heat exchanger extends radially inward from the access panel, and wherein the heat exchanger defines a radially innermost end of the heat exchanger assembly.

12. The heat exchanger assembly of claim 10, wherein the shroud includes a first side wall and a second side wall circumferentially spaced apart from the first side wall to define an inlet of the shroud at an axially forward end of the heat exchanger assembly, and wherein a first radially innermost edge of the first side wall extends at a first angle relative to the outer wall of the bypass duct such that the first radially innermost edge of the first side wall extends radially outwardly and axially aft from the inlet of the shroud, and wherein a second radially innermost edge of the second side wall extends at a second angle relative to the outer wall of the bypass duct such that the second radially innermost edge of the second side wall extends radially outwardly and axially aft from the inlet of the shroud.

13. The heat exchanger assembly of claim 10, wherein the heat exchanger includes an inlet conduit that extends through an end of the access panel, an outlet conduit that extends through the end of the access panel, and a flow passage that is fluidly connected with the inlet conduit and the outlet conduit to direct the cooling fluid from the inlet conduit to the outlet conduit.

14. The heat exchanger assembly of claim 10, wherein the heat exchanger extends axially from a first location of the access panel to a second location of the access panel.

15. The heat exchanger assembly of claim 14, wherein the shroud includes a first side wall and a second side wall coupled with the first side wall and extending from the first side wall toward the access panel to define an inlet of the shroud at an axially forward end of the heat exchanger assembly.

16. The heat exchanger assembly of claim 14, wherein the heat exchanger includes an inlet conduit extending through the access panel, an outlet conduit extending through the access panel and spaced axially from the inlet conduit, and a flow passage that is fluidly connected with the inlet conduit and the outlet conduit to direct the cooling fluid from the inlet conduit axially to the outlet conduit.

17. The heat exchanger assembly of claim 10, wherein the heat exchanger and the shroud are at least partially located outside a footprint of the access panel when the heat exchanger assembly is viewed radially outward looking radially inward.

18. The heat exchanger assembly of claim 10, wherein the heat exchanger and the shroud are supported entirely by the access panel.

19. A method of transferring heat from a cooling fluid to a flow of air passing through a bypass duct of a gas turbine engine, the method comprising:

extending a heat exchanger assembly entirely between an outer wall of the bypass duct to an inner wall of the bypass duct, removably coupling the heat exchanger assembly to the outer wall of the bypass duct, removably coupling an access panel of the heat exchanger assembly with the outer wall to cover an access opening adapted to allow access into the bypass duct through the outer wall, and moving the heat exchanger with the access panel in response to the access panel being uncoupled from the outer wall.

20. The method of claim 19, further comprising supporting the heat exchanger entirely by the access panel.

* * * * *